Edwin Martin.
Cartridges.
N° 88,191.
Patented, Mar. 23, 1869.
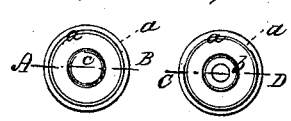
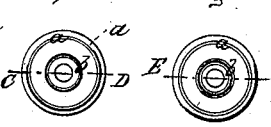
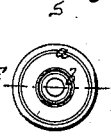
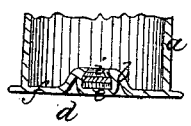
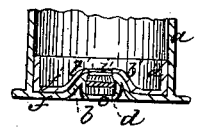
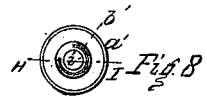
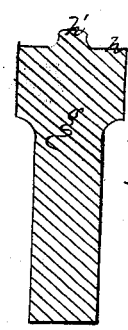
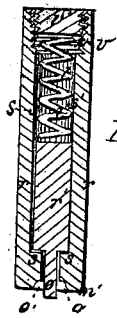
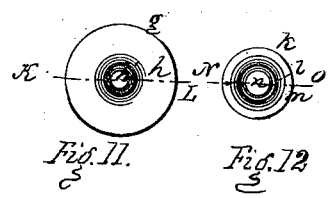
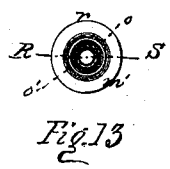
Witnesses: S. C. Burnham, F. E. Rice.
Edwin Martin, Inventor.

UNITED STATES PATENT OFFICE.

EDWIN MARTIN, OF SPRINGFIELD, MASSACHUSETTS, ASSIGNOR TO HIMSELF, S. W. PORTER, AND J. F. CRANSTON.

*Letters Patent No. 88,191, dated March 23, 1869.*

IMPROVEMENT IN METALLIC CARTRIDGES.

The Schedule referred to in these Letters Patent and making part of the same.

*To all whom it may concern:*

Be it known that I, EDWIN MARTIN, of Springfield, in the county of Hampden, and State of Massachusetts, have invented a new and useful Improvement in the Manufacture of Centre-Fire Cartridges; and I do hereby declare that the following is a full, clear, and exact description thereof, reference being had to the accompanying drawings, making a part of this specification, and to the letters of reference marked thereon, in which—

Figures 1, 2, and 3, are plan views of the inside of a cartridge-shell, made according to my improvement, at different stages of completion;

Figure 4 is a longitudinal section through line A B of fig. 1;

Figure 5 is a longitudinal section through line C D of fig. 2;

Figure 6 is a longitudinal section through line E F of fig. 3;

Figure 7 is a plan and side view of the disk;

Figure 8 is a plan view of a reinforcing-cup, used in one modification of the shell;

Figure 9 is a vertical section through line H I of fig. 8;

Figure 10 is a longitudinal section of one modification of a shell having the interior of the shell strengthened by means of the reinforcing-cup, shown in figs. 8 and 9;

Figure 11 is a plan of the face of the heading-tool;

Figure 12 is a plan of the face of the tool used for making the pocket, or receptacle for the fulminate and disk;

Figure 13 is a plan of the tool employed for introducing the fulminate and disk, and for reducing the pocket and shell, and which I denominate the reducing-tool;

Figure 14 is a longitudinal section through N O of fig. 12.

Figure 15 is a longitudinal section through line K L of fig. 11;

Figure 16 is a longitudinal section through line R S of fig. 13; and

Figures 17 and 18 are enlarged longitudinal sections, showing more fully and clearly the details of figs. 6 and 10.

My invention relates to that class of metallic cartridges known as centre-fire cartridges, and consists in forming the pocket, or receptacle for the fulminate and disk, from the whole thickness of the head of the cartridge, by forcing it in from the outside, and then forcing the top of the recess so formed, back again to the plane of the head of the shell, whereby the annular flange, or projection which forms the pocket upon the interior of the head of the shell, is made of double thickness, and thereby strengthened, to more firmly secure the disk in place; and it also consists in strengthening the base, or head of the cartridge, with its said flange, or projection therein, by means of a perforated cup, or disk, the inner edge of which is carried over, and firmly pressed down upon the top of the pocket, or receptacle for the fulminate.

In the manufacture of centre-fire cartridges now in use, wherein the metal is forced up on the interior of the head of the cartridge, to form the interior flange, or pocket, the power required to force up the metal is so great, that very great wear and tear of tools and machinery is the result.

This is obvious, when it is known that the pocket is formed by a blow of the tool placed upon the interior of the head of the cartridge; and the result must be a great outlay of expense in keeping the machinery and tools in repair, while, on account of such wear of machinery, it is extremely difficult to make all the cartridges of the same size, form, and quality.

As my improvement dispenses with a large amount of the power heretofore required, much of the difficulty and expense attending the manufacture of cartridges is obviated, while, by my improved manufacture, the cartridges are made cheaper, with less wear of tools and machinery, are more equal in size, form, and quality, and are more sure in their explosive properties.

That others skilled in the art may be able to make and use my improvement, I will proceed to describe the same.

In the drawings, $g$, figs. 11 and 15, represent the heading-tool, which is cylindrical in form, and having a plane face, $h$, upon which is the projection $h'$. This tool, however, I do not claim as new.

Figs. 12 and 14 represent the tool for forming the pocket, $m$ being the face of the tool, having an annular groove, $l$, therein, leaving the cylindrical projection, $n$, at the centre, the outer end, or face of which is upon the same plane with the face $m$ of the tool.

The reducing-tool, as represented in figs. 13 and 16, consists of a cylindrical piece of metal, having a cylindrical bore, $s'$, therein, the lower portion of the bore being somewhat smaller, making a shoulder at $x$.

The face $m'$ of the piece $r$, has a flat surface, upon a plane at right angles to the outside of the tool; and that part of the face near the centre, and immediately contiguous to the small part of the bore, is chamfered, or bevelled, as shown in section in fig. 16, at $o'$.

A metallic piston, $r'$, properly fitting the bore $s'$, is inserted therein, the lower end $o$ of said piston $r'$, being of a size to fit properly the small bore in the lower end of the cylinder $r$, a shoulder being made at $x'$.

The piston is somewhat shorter in length than the large bore $s'$, and a spiral spring, $t$, is inserted within the bore $s'$, and above the piston $r'$.

At the upper part of the hollow portion $s'$ of the cylinder, is made the thread $v$, into which is turned the screw, or threaded plug, $v'$.

By turning this plug $v'$ either in or out, the proper and desired adjustment of the pressure of the spring $t$ against the piston $r'$ is accomplished.

The parts of the tool being put together as thus described, it is ready for use.

Figs. 8 and 9 represent a reinforcing-cup after it has been placed within the shell, consisting of the base $f'$, the side $a'$, and the conical part $b'$, having the perforation $i'$ therein.

This is, at first, simply a disk of copper, which may be somewhat larger than the inner diameter of the shell, and perforated at the centre, its particular form, as represented in fig. 9, being given to it by driving it into the shell by means of the reducing-tool, at the same time the shell is primed, as hereinafter described.

I take the shell, as ordinarily left when drawn, and inserting a proper tool therein, I force the face $h$ of the tool $g$ firmly against the end of the shell, which, with the tool therein, is grasped by a die, against which die the outer flange of the head is formed.

This die for forming the head is well known, is in common use, and needs no particular description here.

This operation forces in the metal at the centre of the head, forming the recess $e$ at the same time it forms the head of the shell. This brings the shell to the first stage of completion, as shown in fig. 4.

The tool $k$ is next inserted within the shell $a$, and the shell, with the head foremost, and the tool within the shell, is forced down upon a flat, hard surface. By this operation, the small centre projection $n$ of the tool $k$, forces the top, $c$, of the recess $e$ back into said recess, to nearly or quite the same plane with the head, or base, $f$, of the shell, thus doubling the wall, or rim of said recess $e$, or making it of two thicknesses, and leaving an annular, or circular flange, or projection, $b$, upon the interior of the head of the cartridge-shell, forming a circular pocket, or receptacle $i$, as shown in fig. 5.

This method of forming the pocket, or receptacle for the fulminate and disk, has never been used heretofore, to my knowledge, and constitutes a particular feature of my invention; and this operation brings the shell to the second stage of completion.

The disk $d$, having the fulminate thereon, may now be placed upon the small end $o$ of the piston $r'$, the whole tool $r$ being inverted, or placed with the small end $o$, upward, and the tool $r$ being then forced into the shell $a$, the disk $d$, with its fulminate, is forced into place at the bottom of the pocket, or receptacle $i$, and the tool $r$, being forced still further in, the piston $r'$ is forced back against the spring $t$ until the circular projection $b$ enters the groove $o'$. The tool $r$ is then forced in firmly against the interior of the head of the shell, and the inner part of said groove $o'$ being slightly smaller than the diameter of the top of the circular projection $b$, that part of said projection $b$ is pressed together, or reduced in size of diameter.

The size of the pocket $i$, which, before the last operation described, was just large enough to admit the disk $d$, is now so reduced in its diameter, above the disk, as to prevent said disk $d$ from passing out of the pocket $i$, or being forced out by any ordinary blow, and the shell is then complete and primed.

I am aware that a shell has heretofore been made, in which the disk was attached to the interior of the head of the shell, as shown in Letters Patent, No. 65,774, granted, June 11, 1867, to Dexter Smith, and I disclaim any and every part of said device, when considered irrespective of my improved manufacture and construction, inasmuch as the details of construction of said Smith's invention differ very materially from mine in every particular. The pocket, or the circular flange forming the pocket for the fulminate and disk, in said Smith's invention, being drawn, or forced up upon the interior of the head of the shell, of course necessitates the use of very thick copper, from which to form the circular flange, while the wear and tear of machinery and tools, in applying the power necessary to form said flange, is so very great as to render that process quite expensive, or too impractical.

By my invention, I am enabled to use much thinner copper, at much less expense, while the wear and tear of machinery and tools is so slight as to be inappreciable, as very little application of power is required.

If desirable, in the manufacture of cartridges for some purposes, a reinforcement may be placed in the interior of the shell, and over the circular flange $b$, for the purpose of strengthening the shell, and forming a more perfect gas-check. For this purpose, I take a disk of copper, or suitable metal, of a suitable diameter, and perforated at the centre, said perforation being sufficiently large to pass over the small end $o$ of the piston $r'$; and when the reducing-tool is to be forced into the shell, for the purpose of securing the disk $d$ in place, this disk of copper is placed upon the face $m'$ of the tool, the small end $o$ passing through the perforation $i'$, and, as the tool $r$ is forced into the shell, the copper disk is turned up around the edge if its diameter is larger than the interior diameter of the shell, and is forced to the base of the shell; and as the tool $r$ is pressed firmly against the interior of the head, the copper disk takes the form of the face of said tool $r$, the top of the cone $b'$ of the cup being turned over and down upon the top of the circular flange $b$, and forming a perfect gas-check, preventing the gas from entering between the reinforcing-cup and the head of the shell, as shown more fully in figs. 10 and 11.

This reinforcement necessitates no additional operation in securing it in place in the shell, while its efficiency renders it of great value, especially in the use of cartridges containing what is known as "electric powder," when very great and sudden explosive force is exerted upon the shell. This cup, or reinforcement, may be of a length to cover only the head, or may cover a portion of the sides of the shell, as may be desirable.

I am aware that cartridge-shells have been reinforced; but never, to my knowledge, has a reinforcement been employed, constructed and operating as that herein described.

It will be seen that the circular flange, or projection $b$, is of double thickness, and formed so as to give a stronger and firmer seat for the disk than any other centre-fire cartridge-shell of similar construction now in use, while the peculiar manner of forming it, facilitates the manipulation of the metal, and enables the manufacturer to bring the circular flange to just the desired degree of elevation and size.

Having thus described my invention,

What I claim as new, and desire to secure by Letters Patent, is—

1. An interior conical-shaped pocket, or receptacle, containing the fulminate and anvil, when the wall of said pocket is formed of two thicknesses of metal contiguous to each other, substantially as described.

2. Turning over the upper part of the perforated conical portion of the reinforcing-cup upon and into the pocket, or receptacle, for the fulminate and anvil, forming a gas-check, substantially as described.

EDWIN MARTIN.

Witnesses:
S. C. BURNHAM,
C. A. EMERY.